Nov. 18, 1969     E. M. CARLSON     3,479,048

CART

Filed Oct. 9, 1967

INVENTOR.
EMIL M. CARLSON
BY
ATTORNEYS

United States Patent Office 3,479,048
Patented Nov. 18, 1969

3,479,048
CART
Emil M. Carlson, 851 Wendover,
Muskegon, Mich. 49441
Filed Oct. 9, 1967, Ser. No. 673,644
Int. Cl. B62b 1/10, 1/18, 5/00
U.S. Cl. 280—47.23                    7 Claims

ABSTRACT OF THE DISCLOSURE

This disclosure relates to a cart for refuse and the like, wherein a unitary construction is provided with at least two opposite side walls. Wheels are attached to the side walls preferably spaced from the edges thereof through at least one, and preferably two, U-shaped brackets which are attached at one leg thereof to the side walls of the cart and to axles which extend through the wheels. The U-shaped brackets are preferably disposed at right angles to each other on either side of the cart.

---

This invention relates to a cart in which a unitary body construction has at least two opposite side walls and at least one wheel attached to each of the side walls, axle means extending through a central portion of each of the wheels, forming an axis of rotation about which the wheels rotate, and a means for attaching each of the wheels to one of the side walls of the cart, the attaching means comprising at least one U-shaped support bracket rigidly attached at one leg thereof to the one side wall and to an end of the axle, and at the other leg to the other end of the axle.

In another of its aspects the invention relates to a cart as has been hereinbefore described wherein the axis of rotation of the wheels are spaced from the edges of the side walls.

In another of its aspects the invention relates to a cart as has been hereinbefore described wherein there are two U-shaped bracket members for each wheel, each bracket is attached at one leg to the side wall and to the axle means and extends around the wheel and is attached to the other end of the axle.

Two wheeled dumping carts are well known. The dumping carts are characterized by a rather large capacity body construction and generally two wheels, one attached to each side of the cart. The wheels are generally large with relation to the body and extend out in front of and beneath the cart so that the cart can be dumped over with ease.

In attaching the large wheels to the side of the cart, it is desirable that the wheels be relatively close to the sides of the body having axles about which they rotate which do not extend through or into the cart body itself.

Such a dumping cart is disclosed by Snyder, 2,191,327. In the disclosed cart, the axles of the wheels are journalled in the unitary support member which is attached to the side of the body. Thus, the wheel is supported substantially at one point along the side of the cart, and is subject to breakage at that point.

I have now discovered an attaching means for such a cart in which the wheels can be rigidly attached to the side walls through U-shaped brackets without the necessity of having the axles pass through the center of the cart, and without the weakness of the attaching means of the prior art.

By various aspects of this invention, one or more of the following, or other objects, can be obtained.

It is an object of this invention to provide a novel dumping cart.

It is another object of this invention to provide an improved attaching means for a large wheeled cart.

It is still a further object of this invention to provide a rigid attaching means for a large capacity, large wheeled dumping cart wherein a rigid wheeled attachment is provided without the necessity of extending the axle through the center of the cart.

Other aspects, objects, and the several advantages of this invention are apparent to one skilled in the art from a study of this disclosure, the drawings, and the appended claims.

According to the invention there is provided a cart structure having a unitary body with at least two opposite walls and at least one wheel attached to each of the side walls, preferably spaced from the edges of the side walls. Axle means are provided through each of the central portions of the wheel to form an axis of rotation about which the wheel can rotate. The wheels are attached to the side walls of the cart according to the invention through at least one U-shaped bracket which is rigidly attached at one leg thereof to one side wall and to one end of the axle and at the other leg to the other end of the axle on the outside of the wheel.

The one leg of the bracket is rigidly attached to the side wall of the cart through at least two attaching means such as a screw, each of the attaching means being positioned on either side of the axle.

Preferably, two U-shaped brackets are provided on each wheel, and each of the U-shaped brackets are positioned at right angles to each other.

The invention will now be described with reference to the accompanying drawings in which.

Figure 1:
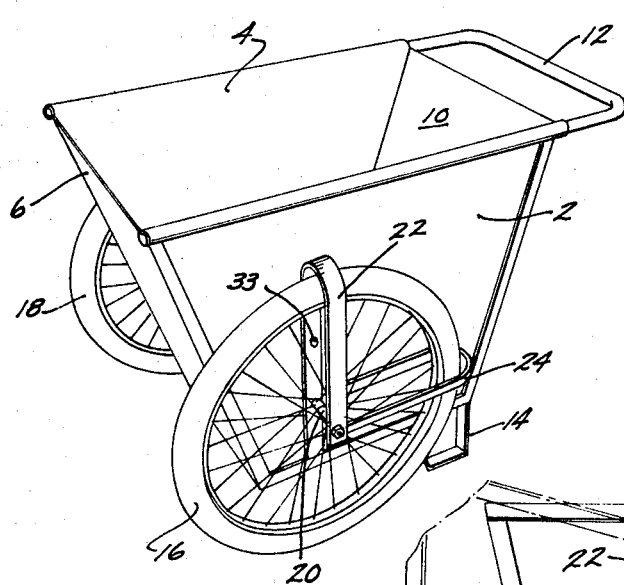
FIG. 1 is a perspective view of a cart embodying the invention.
Figure 4:
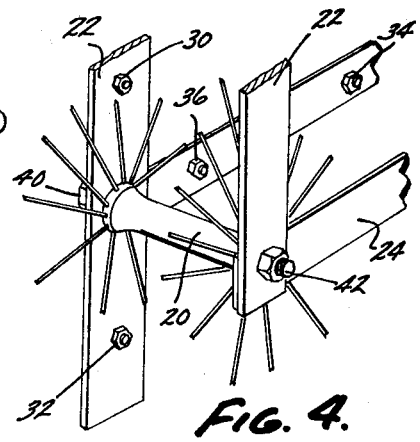
FIG. 4 is a close-up view of the connections employed between the brackets, side wall, and axle.

Referring now to the drawings, a dumping cart is shown having side walls 2 and 4, downwardly and inwardly sloping front wall 6, downwardly and inwardly sloping back wall 10, and bottom wall 8 joining the sides, front, and back walls. The cart is provided with a handle 12 and a support means 14 positioned at the back portion of the cart.

Figure 2:
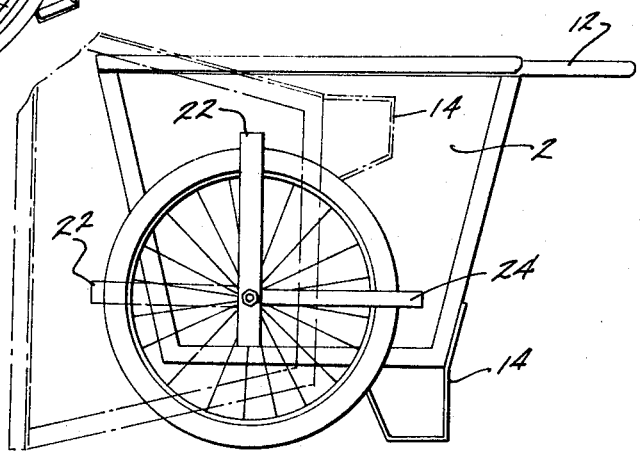
FIG. 2 is a side view of the cart shown in FIG. 1 with the dumping position shown in phantom lines.
Figure 3:
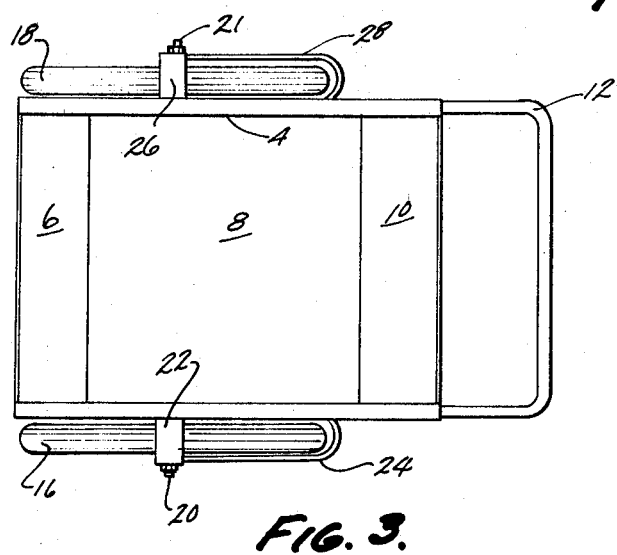
FIG. 3 is a top view of the cart shown in FIGS. 1 and 2.

The cart has a wheel 16 on one side thereof and a wheel 18 on the other side thereof. Wheel 16 is supported by axle 20, and wheel 18 is supported by axle 21. As can be seen from FIG. 2, the wheels are attached so that the axis of rotation or axle 20, for example, is spaced from the bottom and front walls of the cart. As can be seen from FIG. 3, the axles of the wheels do not extend into or through the container body portion of the cart.

According to the invention, the wheels are attached to the cart through brackets 22 and 24. The inner leg of bracket 22 is attached at 30, 32, and 33 to the side 2 of the cart, and this leg is also attached to axle 20 through bolt 40. The vertically positioned U-shaped bracket 22 is attached to the side 2 of the cart through other bolts spaced upwardly of bolt 30, such as at 33. However, it is noted that at least one bolt which attaches the bracket to the side of the cart is attached at either side of axle 20.

The horizontally shown bracket member 24 is attached to the cart through at least two bolts 34 and 36 and also is attached to axle 20 between both the central portion 38 of wheel 16 and bolt 40. Each of the U-shaped brackets is rigidly attached thereby to the side of the cart. The U-shaped brackets extend around the wheel and attach to the other end of axle 20 through bolt 42.

It is to be understood that the wheel 18 is attached to side 4 in a manner similar to that described with reference to the attachment of wheel 16 to side 2.

It will be appreciated from the foregoing that the U-shaped brackets provide a rigid end support for the axles which in turn support the wheels. By the preferred embodiment of the invention, in which two U-shaped brackets are used at right angles to each other, the axle is supported against movement in substantially all directions of the plane containing side 2.

It is to be understood that, whereas the invention has been described with reference to two U-shaped brackets, it is within the scope of the invention to provide an attachment to a cart with one U-shaped bracket or three or more U-shaped brackets in the manner described for two brackets.

Whereas the invention has been described with reference to a dumping cart, it is obvious that other types of carts can be employed within the scope of the invention. For example, large hospital tray carts, laundry carts, and the like could be constructed employing the inventive concept.

Reasonable variation and modification are possible within the scope of the invention without departing from the spirit thereof.

I claim:

1. In a cart of the type described wherein a unitary hopper body construction contains at least two substantially planar opposite side walls, a wheel attached to each of the side walls, and a separate axle supports each of the wheels for rotation, said axle for each of said wheels terminating outwardly of and closely adjacent said side walls, said axle being juxtaposed to said side walls above the bottom thereof such that the bottom of said body extends below said axle for each wheel, the improvement which comprises: means for attaching each of the wheels to one of the side walls comprising a pair of angularly disposed U-shaped support brackets, each of said U-shaped brackets rigidly attached through one leg thereof to said one side wall and to one end of said axle, the other leg of each of said U-shaped brackets being attached to the other end of said axle, said wheels being disposed forwardly on said body so as to permit substantially complete dumping of said cart without the necessity of lifting said wheels off their supporting surface.

2. A cart according to claim 1, wherein at least two attachment means are provided between said one leg of said U-shaped support bracket and said side wall of said cart, one of said attachment means positioned on either side of said axle means.

3. A cart according to claim 1, wherein one of said U-shaped brackets is positioned substantially vertically.

4. A cart according to claim 1, wherein one of said U-shaped brackets is positioned substantially horizontally.

5. A cart according to claim 1, wherein each of said U-shaped brackets is placed at a right angle to the other.

6. A cart according to claim 1, wherein said cart contains a front wall which slopes downwardly and inwardly, and each of said wheels extends over said front and said bottom of said cart.

7. A cart according to claim 6, wherein said cart contains a support means on the bottom thereof rearwardly of said wheel and the center of gravity of said cart is rearwardly of said axis of rotation of said wheel when said cart is resting on said support means.

References Cited

UNITED STATES PATENTS

| 2,102,684 | 12/1937 | Dorward | 298—2 X |
| 887,133 | 5/1908 | Smith | 280—63 |
| 3,281,874 | 11/1966 | Sholl | 280—47.32 |

FOREIGN PATENTS

| 909,534 | 5/1954 | Germany. |
| 216,249 | 5/1924 | Great Britain. |
| 797,368 | 7/1958 | Great Britain. |

RICHARD J. JOHNSON, Primary Examiner

U.S. Cl. X.R.

280—47.26; 298—2